Aug. 22, 1933.　　　A. L. RAWLINGS　　　1,923,885
GYROSCOPIC COMPASS
Filed June 28, 1930　　　2 Sheets-Sheet 2

INVENTOR
Arthur L. Rawlings
BY
Herbert F. Thompson
his ATTORNEY.

Patented Aug. 22, 1933

1,923,885

UNITED STATES PATENT OFFICE 1,923,885

GYROSCOPIC COMPASS

Arthur L. Rawlings, London, England, assignor to Sperry Gyroscope Company, Inc., Brooklyn, N. Y., a Corporation of New York Application June 28, 1930, Serial No. 464,595, and in Great Britain January 16, 1930

5 Claims. (Cl. 33—226)

This invention relates to improvements in gyroscopic compasses, particularly of the Sperry type including a liquid control system for the purpose of orientation or North-seeking. The Sperry compass as at present used is constructed substantially in accordance with the specification of U. S. Patent No. 1,362,940, dated December 21, 1920, and is also provided with compensating weights for the use of which reference may be made to the specifications of U. S. Patent No. 1,499,222, dated June 24, 1924.

The principal object of the present invention is to simplify the construction of the Sperry compass whereby the weight is lessened, the balancing operations become less involved, and some of the bearings, which may give trouble are eliminated.

According to this invention we eliminate entirely the necessity for compensating weights and also eliminate the necessity for mounting the liquid control system upon the follow-up element, thereby dispensing with a set of horizontal bearings between the liquid control system and the follow-up element. We also suppress the usual eccentric connection or bearing between the liquid control system and the gyro casing by which damping has been secured hitherto in the Sperry type compass.

Damping of the compass of the type shown in the aforesaid Patent No. 1,362,940 cannot be secured by mounting an energy-abstracting device on the gyro casing as can be done in the other types of gyro compasses, but according to a further feature of the present invention we produce a very simple damping which involves merely a method of balancing the compass about its vertical axis.

More particularly the present invention involves a number of changes in the usual Sperry compass as will now be explained with reference to the accompanying drawings in which:—

Figure 1:
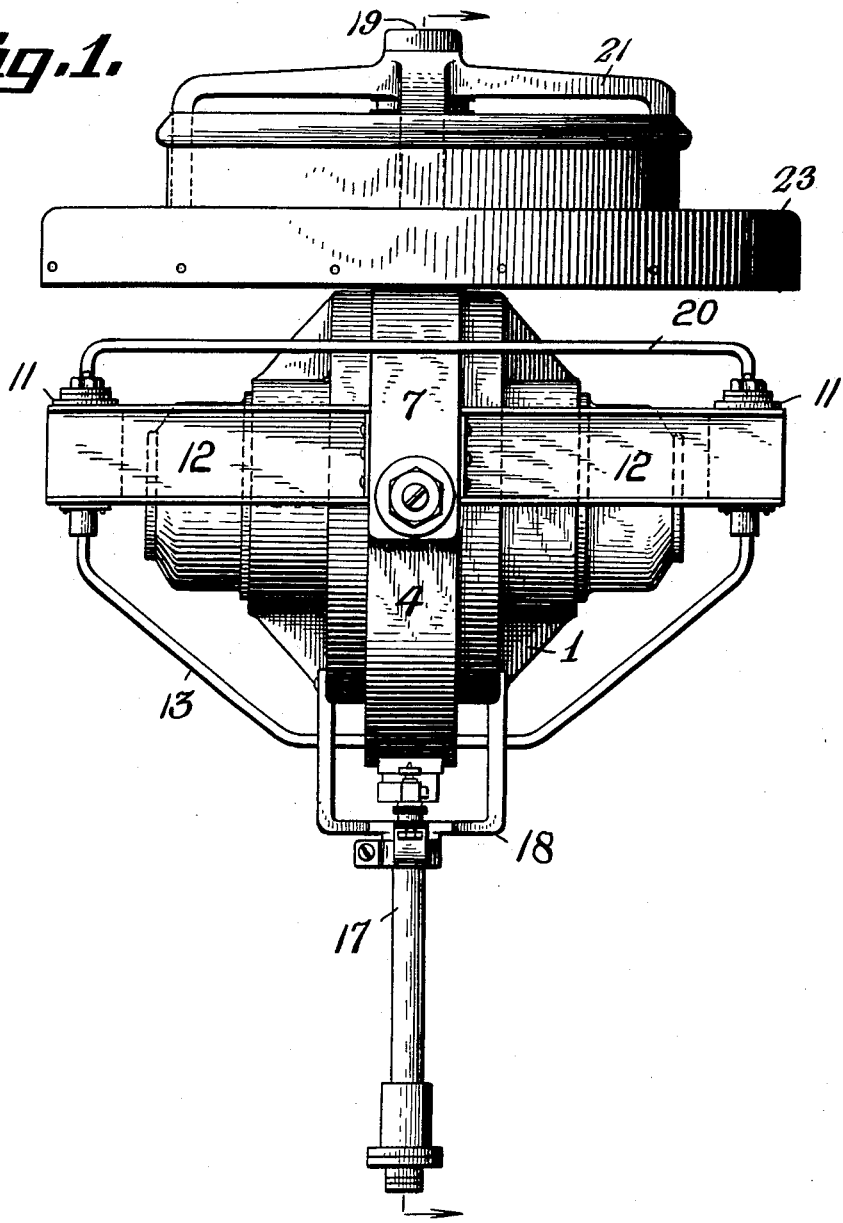
Fig. 1 is an elevation of a gyro compass embodying the features of the present invention.

In the construction hitherto usually adopted, the casing containing the gyroscope is pivotally supported for oscillation about its horizontal diameter in a "vertical" ring, which in its turn is supported in a "phantom" ring so as to be free to oscillate about a vertical axis in a spider or frame, which in turn is mounted for oscillation about both horizontal axes in the usual gimbal system. This phantom ring is caused to remain co-planar with the vertical ring by an electric follow-up motor. According to the present invention these axes are interchanged. The gyro casing 1 can oscillate about its vertical diameter in bearings 2, 3, in the vertical ring 4, which latter oscillates about its horizontal diameter in bearings 5, 6 in the phantom element 7. The phantom element in turn is mounted for rotation about vertical axis 19 in the spider or frame 21, the spider in turn being mounted in the usual manner for oscillation about both horizontal axes within the usual gimbal ring 22 which supports the spider on trunnions 22' and in turn is pivotally supported from the binnacle 23 on trunnions (not shown) at right angles to trunnions 22'. The follow-up motor 8 drives the phantom ring in azimuth as in the usual Sperry compass, and is controlled by contacts 9, 10 or equivalent means cooperating as between the gyro casing and the vertical ring so that these two elements are always co-planar. Since the gyro casing is maintained in a substantially vertical plane by gyroscopic action during the ordinary working of the compass, it follows that in the new construction the vertical ring 4 is similarly constrained to one vertical plane. Consequently the compensating weights (which were necessary to equalize the moments of inertia of such parts of prior compasses as could swing by the motions of the ship in any vertical plane) are no longer necessary and are eliminated. This elimination leads to a reduction of the number of parts in the compass and dispenses entirely with the need for careful adjustment of these weights as has been required heretofore.

In view of the above described changes from the usual construction, the liquid control system may be secured directly to the gyro casing thereby suppressing the usual bearing supporting the same on the follow-up element and also the third bearing or eccentric connection connecting the liquid containers to the gyro casing. We prefer, however, to mount the liquid container on the vertical ring instead of on the gyro casing. This mounting does not necessitate the employment of any bearings, for the inter-connected liquid containers 11 may be bolted as by brackets 12 directly to the vertical ring 4. This mode of mounting has the advantage over the system of mounting the containers directly on the gyro case that any unequal distribution of the liquid in the containers in the east-west direction will not exert a torque around the vertical axis of the gyro casing, which would otherwise be the case, especially if a large container were employed, such as would be necessary if a lighter liquid than mercury were used. Owing to this and to the absence of compensating weights we are able to use containers of large size so that oil or similar light liquid may be employed if desired instead of mercury. Taking advantage of the property of forced oscillation in a U-tube, as described in the specification of Patent No. 1,362,940, we can use with a light liquid a connecting pipe 13 between the containers of large diameter, say ¼ inch to ½ inch inside without local constriction and still secure freedom from rolling error. An air pipe 20 runs from the top of one container to the top of the other to equalize the air pressure in the containers.

Figure 2:
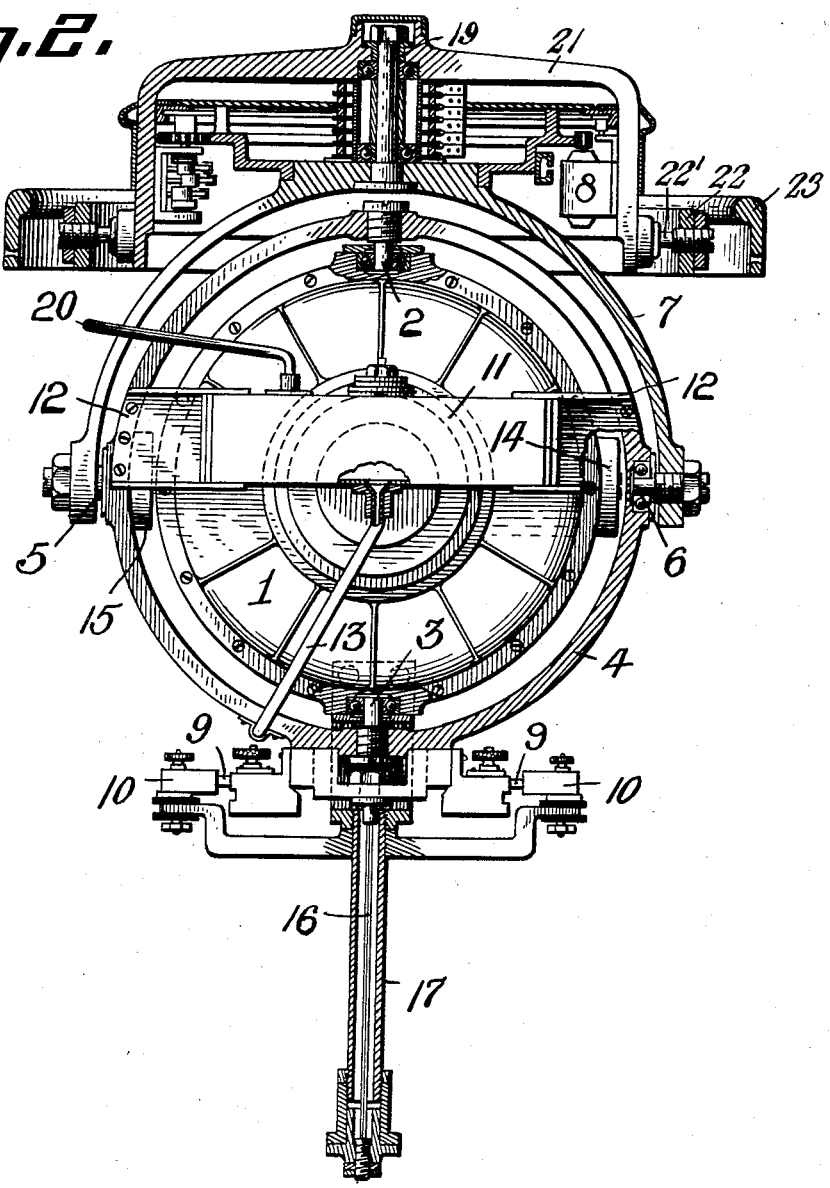
Fig. 2 is a sectional elevation taken at right angles to the elevation of Fig. 1.

A further feature of the invention consists in damping the compass by a very simple arrangement and without employing any extraneous source of power or introducing any additional moving parts or bearings. Heretofore it has been thought that a top heavy counter-earthwise spinning gyro compass could not be damped by means secured to the gyro casing except by introducing a source of power to cause a forced flow of the liquid damping means (see U. S. Patent No. 1,866,733 dated July 12, 1932). We, on the other hand, can damp the compass simply by the addition of weight to one side of the gyro casing; for this purpose we may mount the gyro casing 1 so that the center of gravity of it and the contained rotor is slightly to the west of the vertical axis by which the casing is supported in the vertical ring 4. This slight displacement of the center of gravity may be obtained by attaching a weight 14 to the west side of the casing as shown in Fig. 2. In this way we ensure that, when the gyro axle is inclined, a torque is exerted around the vertical axis of the gyroscope in such direction as to cause precession reducing the inclination and, therefore, damp the compass through the reaction on the follow-up element, the action being somewhat similar to the usual eccentric connection but avoiding the necessity of damping through the liquid control system. In order to maintain the balance of the compass as a whole, the east side of the vertical ring 4 may be suitably loaded as by a weight 15 to compensate. Any inclination of the gyro axle from the horizontal causes an equal departure of the axis of the gyro casing and vertical ring from its normally vertical position. The center of gravity of the rotor and gyro casing being to the west of this axis, a torque is then applied to the gyro causing it to precess in such a direction as to reduce the inclination of the gyro axle.

The weight of the gyro and casing may be supported in the vertical ring 4 by means of a wire suspension, in the well known manner. We prefer, however, to place the wire suspension at the bottom instead of at the top of the compass as is usually done. We, therefore, arrange the suspension to hang down below the bottom of the vertical ring. This may be effected by attaching the lower end of the suspension wire 16 to the lower end of a tube 17 which surrounds the wire. The upper part of the tube 17 ends in a fork 18 which embraces the lower part of the vertical ring 4 without touching it (as shown in Fig. 1). The gyro casing 1 is secured to the upper ends of the limbs of the fork. The weight of the gyro and casing is thus carried by the suspension so that the guide bearings 2, 3, provided for the gyro casing at the ends of the vertical diameter of the vertical ring are required to take radial thrust only.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyroscopic compass of the liquid-controlled type, a gyro rotor casing, a vertical ring in which the casing is journalled for rotation about a vertical axis, a phantom ring in which said vertical ring and its contained parts are mounted for oscillation about a substantially horizontal axis in substantially neutral equilibrium, a liquid control system mounted to oscillate with said vertical ring and casing, a spider in which said phantom ring is journalled for rotation about a vertical axis, and a gimbal support for said spider.

2. In a gyroscopic compass of the liquid-controlled type, a gyro rotor casing, a vertical ring in which the casing is journalled for rotation about a vertical axis, means for unbalancing said casing about its vertical axis for the purpose specified, a phantom ring in which said vertical ring and its contained parts are mounted for oscillation about a substantially horizontal axis in substantially neutral equilibrium, counterbalancing means thereon, a liquid control system mounted to oscillate with said vertical ring and casing, a spider in which said phantom ring is journalled for rotation about a vertical axis, and a gimbal support for said spider.

3. In a gyroscopic compass, a gyro rotor casing, a vertical ring, upper and lower guide bearings between said casing and ring, a torsion suspension below said ring for supporting the casing from the bottom of the ring, follow-up controller between said casing and ring to cause the ring to follow the casing in azimuth, an outer member in which said ring is pivoted on a horizontal axis, pivotal means at the top thereof mounting said member for turning about a vertical axis, and a follow-up motor controlled by said controller for turning said member and ring.

4. In a gyroscopic compass, a gyro rotor casing, a vertical ring, upper and lower guide bearings between said casing and ring, a torsion suspension below said ring for supporting the casing from the bottom of the ring, connected liquid containers secured to opposite sides of said ring for imparting meridian properties to the compass, an unsymmetrical damping mass on one side of said casing and a like unsymmetrical mass on the opposite side of said ring, follow-up controller between said casing and ring to cause the ring to follow the casing in azimuth, an outer member in which said ring is pivoted on a horizontal axis, pivotal means at the top thereof mounting said member for turning about a vertical axis, and a follow-up motor controlled by said controller for turning said member and ring.

5. In a gyroscopic compass, a gyro rotor casing, a vertical ring, upper and lower guide bearings between said casing and ring, a bracket secured to the bottom of said casing, a tube extending downwardly therefrom, a torsion suspension secured at the bottom thereof to a point adjacent the bottom of the tube and at its top to the bottom of said ring, and follow-up means between said casing and ring to cause the ring to follow the casing in azimuth.

ARTHUR L. RAWLINGS.